July 29, 1958 — E. E. SHIPLEY — 2,844,947

LUBRICATION SYSTEM FOR "POLYGON" TYPE SHAFT COUPLING

Filed Dec. 31, 1956

INVENTOR:
EUGENE E. SHIPLEY
BY
HIS ATTORNEY

United States Patent Office 2,844,947
Patented July 29, 1958

2,844,947

LUBRICATION SYSTEM FOR "POLYGON" TYPE SHAFT COUPLING

Eugene E. Shipley, Middleton, Mass., assignor to General Electric Company, a corporation of New York Application December 31, 1956, Serial No. 631,961

7 Claims. (Cl. 64—6)

This invention relates to shaft couplings, particularly to the structure and method of lubricating a shaft coupling of the "polygon" type, comprising a pair of inter-fitting members of non-circular cross-section. The mating members may have a cross-section of a shape which may be described as a "curved-sided polygon," of three or more sides. The external member has an opening generally the same shape as that of the internal member, but slightly larger so that a substantial clearance space is defined at the inter-fitting surface. In operation, the inner member rotates until it firmly engages the curved sides of the mating recess in the external member, so that the clearance space between the members becomes a plurality of circumferentially spaced wedge-shaped clearances. A suitable lubricant may be provided in these clearance spaces. Angular misalignment between the axes of the coupled shafts will result in a slight relative movement or "working" of the inter-fitting parts of the coupling, and the lubricant is intended to reach all contact surfaces of the polygons.

The "polygon" type of coupling has been known for some time and is not my invention; but it has previously been limited to comparatively low speeds and light loads. It becomes practicable for very high speeds and substantial quantities of power transmitted only if an effective lubrication system is provided.

A polygon type coupling may be operated "dry," with no lubricant supplied, in simple low-power equipment, such as food mixing equipment. In these cases, the coupling parts may be made of a "self-lubricating" material such as nylon. For moderate loads and some degree of misalignment between the shafts, a grease-packed coupling may be used. This is satisfactory so long as the heat generated is not sufficient to melt the grease so that the liquified lubricant supply is lost by leakage.

For high capacity couplings, a "wet" lubricating system, utilizing a liquid lubricant, is required. The lubricant is, of course, supplied in sufficient quantities that it not only lubricates but also carries away the heat generated and any solid particles eroded from the cooperating coupling parts. Thus, the lubricating oil is also a coolant and a flushing agent serving to keep the contacting surfaces clean. For high speeds, high loads, and substantial degrees of shaft misalignment, an oil-lubricated type of coupling is required. The majority of flexible shaft couplings used in the mechanical arts today are, therefore, of the "wet" type.

Application of the polygon type coupling has heretofore been hindered by the lack of a really effective wet lubricating system. Because of its inherent low cost and long service life, the polygon coupling is expected to find a much wider field of application when a good lubricating system is available.

Accordingly, the object of the present invention is to provide an improved form of polygon type shaft coupling, capable of operating at high speeds and transmitting substantial amounts of power, and with a substantial degree of misalignment between the shafts.

A specific object is to provide an improved "wet" lubricating system for a polygon type coupling.

Other objects and advantages will become apparent from the following description taken in connection with the accompanying drawings, in which Fig. 1 illustrates the basic geometry of the conventional polygon coupling;

Generally stated, the invention is practiced by supplying oil to the clearance space at the minimum radius of the mating surfaces of a polygon type coupling, whence the lubricating liquid travels by centrifugal force throughout the contact area between the mating parts. Thus, the inherent geometry of the cooperating polygon parts is employed to assist in distribution of the lubricant.

Figure 1:
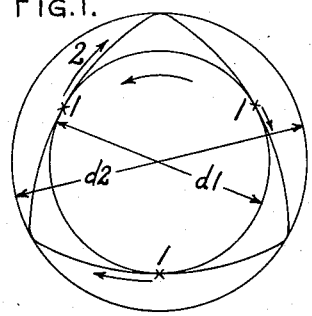

Referring now more particularly to the drawings, Fig. 1 represents the basic geometry of the polygon type coupling. It is evident that there is an inscribed circle, of diameter $d1$, and a circumscribed circle, of diameter $d2$, which constitute an annular "envelope" containing the polygonal surfaces. The cross-section of the polygon coupling illustrated is substantially triangular; the sides, however, are slightly convex. It is to be understood that other cross-section configurations, having more than three sides, may also be used. If oil is injected at the point of tangency of the inscribed circle $d1$, identified by the "minimum radius" points 1, centrifugal force will drive the oil outward toward the "maximum radius" points of tangency of the circumscribed circle $d2$, as illustrated by arrow 2. The "loaded" parts of the contact surfaces of the polygon will then be effectively lubricated in a positive manner.

Figure 2:
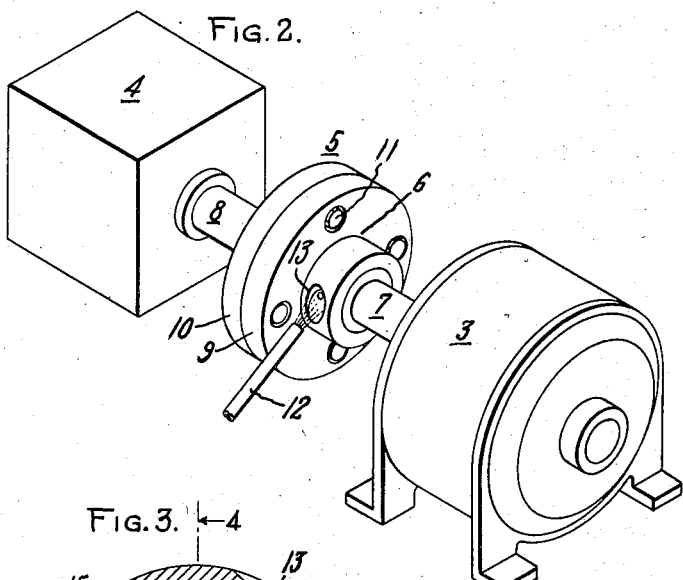
Fig. 2 shows an assembled driving and driven device and employing a polygon shaft coupling.

Fig. 2 is a perspective drawing of an application of the polygon coupling, and illustrates how the joint can be used as a flexible coupling, and how the oil may be supplied. Shaft 7 of prime mover 3 is connected by the polygon coupling shown generally at 5 to shaft 8 of any desired load device 4. The external coupling member 6 is securely fastened to shaft 8, as by bolting the flange 9 to flange 10 with bolts 11. Flange 10 in turn is secured to shaft 8. The internal coupling member (not visible in Fig. 2) is securely fastened to, or formed integral with, shaft 7. A nozzle 12 directs a stream of oil into "pick-up scoops" 13 of the coupling member 6.

Figure 4:
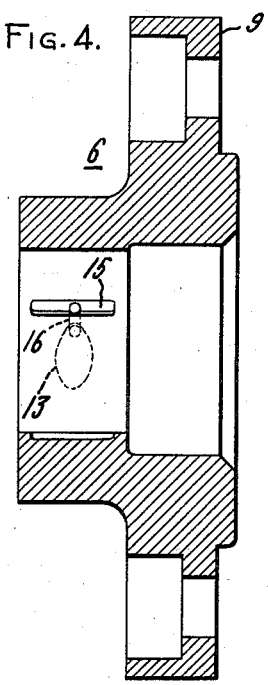
Fig. 4 is a longitudinal sectional view of the external coupling member taken on plane 4—4 of Fig. 3.
Figure 3:
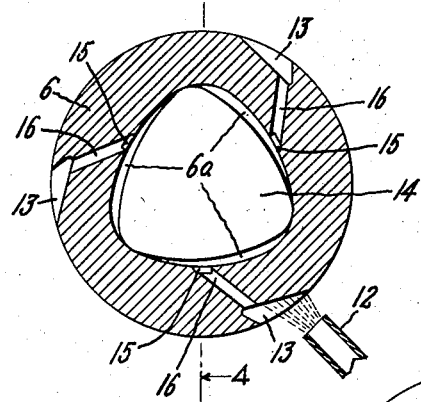
Fig. 3 is a cross-sectional view of a polygon coupling which incorporates the invention.

Referring now to Fig. 3, there is illustrated an internal polygon 14 driving an external polygon 6 with pick-up scoops 13 and axial oil distribution grooves 15. The clearence spaces $6a$ are "wedge-shaped" and in this figure have been exaggerated to show the arrangement more clearly. Oil is injected at the three points of tangency of the inscribed circle $d1$ of Fig. 1, that is, at the minimum radius of the surface of the external member. The oil delivery nozzle 12 directs the oil into the scoops 13. A "spreader groove" 15, running axially as illustrated in Fig. 4, helps to distribute the oil across the full face of the polygon. The radially directed oil jet impacted by the rotating scoops 13 will be driven inwardly through conduits 16 to the spreader grooves 15. From these grooves, the oil is carried by centrifugal force outwardly so as to lubricate the full contact surface, the path of the oil being indicated by arrow 2 in Fig. 1. Excess oil not picked up by the scoop will act as a cooling medium, flowing over the outer surfaces of the coupling member 6 to keep the temperature at a safe level.

If the rotation is in the reverse direction, then the scoops 13 will be oriented in the opposite direction. If the coupling has to operate in both directions, six oil scoops may be provided in the external member, three arranged for each direction of rotation.

Figure 5:
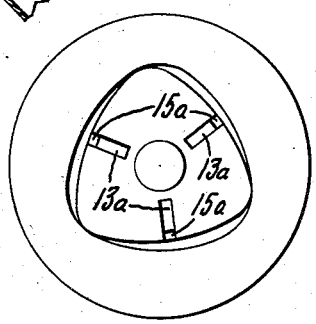
Fig. 5 illustrates a second embodiment of the invention, better adapted for either direction of rotation.
Figure 6:
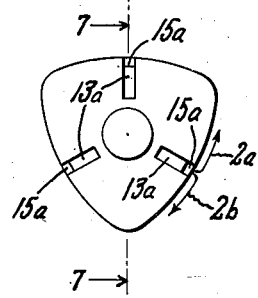
Fig. 6 illustrates the internal coupling member of Fig. 5, and shows the path taken by the oil upon rotation of the polygon coupling in either direction.
Figure 7:
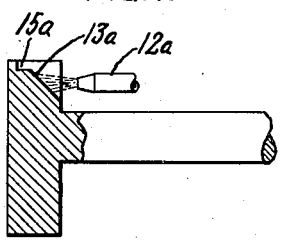
Fig. 7 is a cross-section view of the internal coupling member, taken along plane 7—7 in Fig. 6.

Figs. 5, 6 and 7 illustrate a modification of the invention which allows the oil to work with (rather than against) centrifugal force, so as to follow a smooth and natural path to a point on the smallest diameter $d1$ of the polygon. This modification is equally well suited for rotation of the coupling in either direction, since, once the oil has been supplied to the minimum radius points 1, it will flow in either direction along the surface of the coupling members, depending upon the direction of rotation. Referring to Fig. 6, the oil will be driven by centrifugal force in the direction illustrated by arrow $2a$ when the coupling is rotating in a clockwise direction; and the oil will follow the path indicated by the arrow $2b$ when the coupling rotates counter-clockwise.

Referring to Fig. 7, the oil distributing slot in this modification consists of a plurality of beveled grooves $13a$ and axial spreader grooves $15a$. It will be seen that these grooves lie in a generally radial axial plane. A stream of oil is directed axially toward the bevel grooves $13a$ by the nozzle $12a$. When the stream hits the inclined surface of the bevel $13a$, it flows up the bevel, spreads out in the spreader groove $15a$, and thus supplies an adequate quantity of oil to the "minimum diameter points" of the polygon surfaces. Then centrifugal force will throw the oil outward, toward the maximum radius points of the polygon, thus lubricating the entire contact surfaces of the members.

It will be apparent that the general theory of operation of this lubricating system for a polygon type coupling is to supply oil by any suitable means to the minimum radius points of the polygon surfaces. By the use of appropriate spreader grooves, the oil is distributed across the full face width of the mating members. This then allows centrifugal force to positively carry oil throughout the contacting surfaces, thus satisfactorily lubricating, cooling, and flushing worn particles from the joint. With such lubrication, the polygon coupling may effectively be used as a flexible coupling for transmitting substantial loads, so that vibrations and shaft misalignment may be tolerated.

While I have described only certain preferred embodiments of my invention by way of illustration, many modifications will occur to those skilled in the art. I, therefore, wish to have it understood that I intend in the appended claims to cover all such modifications as fall within the true spirit and scope of my invention.

What I claim as new and desire to secure by Letters Patent of the United States is:

1. A coupling for a pair of substantially aligned shaft ends comprising a first internal coupling member having a generally polygon cross-section of at least three sides, a second external coupling member having a central recess of substantially similar cross-section and surrounding the first member with clearance spaces defined between said cooperating polygon surfaces, and means for injecting a lubricating liquid into said clearance spaces at the minimum radius points of the polygon surfaces, whereby centrifugal force carries the lubricant outwardly throughout the mating contact areas of the polygons.

2. In a polygon type shaft coupling having external and internal members with mating generally polygon surfaces, the combination of means for supplying a lubricating liquid to the minimum radius points of the polygon surfaces, whereby centrifugal force distributes the lubricant outwardly throughout the mating contact areas of the polygon surfaces.

3. A coupling for a pair of substantially aligned shaft ends comprising a first internal coupling member having a generally polygon cross-section of at least three sides, a second external coupling member having a central recess of substantially similar cross-section and surrounding the first member with clearance spaces defined between the cooperating polygon surfaces, and means for injecting a lubricant into said clearance spaces at the minimum radius points of the polygon surfaces which comprises at least three scoop recesses formed in the rim of the external coupling member, nozzle means for directing a liquid into said scoops, and conduit means in the external member for conducting liquid from the scoop recesses to the respective minimum radius points of the polygon surfaces.

4. A coupling for a pair of substantially aligned shaft ends comprising an internal coupling member having a general polygon cross-section of at least three sides, an external coupling member having a central recess of substantially similar cross-section and surrounding the internal member with clearance spaces defined between the cooperating polygon recesses, and means for supplying lubricant to the minimum radius points of the polygon surfaces comprising a plurality of bevel grooves in the internal coupling member, each disposed in a generally radial axial plane and having a bottom surface oriented at an acute angle to the axis of rotation, the bevel grooves opening through the side face of the internal coupling member and delivering liquid to the minimum radius points of the cooperating polygon surfaces, and means for supplying liquid to said grooves.

5. In a polygon type shaft coupling having external and internal members with mating generally polygon surfaces, the combination of means for supplying a lubricating liquid to the minimum radius points of the mating polygon surfaces comprising at least one pickup scoop formed in the external coupling member, means for directing liquid into the scoop, and conduit means in the external member for conducting liquid picked up by the scoop inwardly to at least one minimum radius point of the polygon surfaces.

6. A polygon type shaft coupling having external and internal members with mating generally polygonal surfaces, and means for supplying lubricant to the minimum radius points of the polygon surfaces comprising at least one bevel slot opening through a side surface of the internal coupling member and connecting with a minimum radius point of the mating polygon surfaces, and means for directing a stream of oil into the bevel slot.

7. A polygon type shaft coupling having external and internal members with mating generally polygonal surfaces, a combination of means for supplying a lubricating liquid to the minimum radius points of the polygon surfaces, one of the polygon members defining axially extending lubricant spreader grooves at the minimum radius point of the polygon surfaces for distributing lubricant axially through the width of the face of the mating polygon surfaces, whereby centrifugal force distributes the lubricant outwardly throughout the mating contact areas of the polygon surfaces.

References Cited in the file of this patent

UNITED STATES PATENTS

| | | |
|---|---|---|
| 1,573,197 | Schuette | Feb. 16, 1926 |
| 1,857,527 | Burrell | May 10, 1932 |
| 1,927,924 | De Vlieg | Sept. 20, 1933 |
| 2,726,523 | Zrodowski | Dec. 13, 1955 |